United States Patent
Couvee et al.

(10) Patent No.: US 10,282,948 B2
(45) Date of Patent: May 7, 2019

(54) DEVICE FOR INDICATING A DATACENTER RACK AMONG A PLURALITY OF DATACENTER RACKS

(75) Inventors: Philippe Couvee, Villard Bonnot (FR); Jean-Olivier Gerphagnon, Seyssins (FR); Virginie Megy, Claix (FR)

(73) Assignee: BULL SAS, Les Clayes Sous Bois (FR)

( * ) Notice: Subject to any disclaimer, the term of this patent is extended or adjusted under 35 U.S.C. 154(b) by 0 days.

(21) Appl. No.: 14/113,811

(22) PCT Filed: Apr. 17, 2012

(86) PCT No.: PCT/FR2012/050836
§ 371 (c)(1),
(2), (4) Date: Oct. 24, 2013

(87) PCT Pub. No.: WO2012/146857
PCT Pub. Date: Nov. 1, 2012

(65) Prior Publication Data
US 2014/0055240 A1    Feb. 27, 2014

(30) Foreign Application Priority Data
Apr. 26, 2011 (FR) ................................. 11 53571

(51) Int. Cl.
*G08B 5/22* (2006.01)
*G08B 25/00* (2006.01)
(Continued)

(52) U.S. Cl.
CPC .............. *G08B 5/36* (2013.01); *G06F 11/324* (2013.01)

(58) Field of Classification Search
CPC .................................. G08B 5/36; G06F 11/324
See application file for complete search history.

(56) References Cited

U.S. PATENT DOCUMENTS

| 4,829,596 | A | * | 5/1989 | Barina | G05B 19/054 356/73.1 |
| 5,664,146 | A | * | 9/1997 | Bolin | G11B 27/002 710/13 |

(Continued)

FOREIGN PATENT DOCUMENTS

| WO | WO 2003/075117 A2 | 9/2003 | |
| WO | WO 2005/071525 A2 | 8/2005 | |
| WO | WO 2005071525 A2 * | 8/2005 | ............... G06F 3/00 |

OTHER PUBLICATIONS

PCT, International Search Report, dated Jun. 14, 2012, for International Application No. PCT/FR2012/050836.

*Primary Examiner* — Quang Pham
(74) *Attorney, Agent, or Firm* — Pillsbury Winthrop Shaw Pittman LLP (57) ABSTRACT

A device for indicating a rack among a plurality of racks, the rack being configured to receive a plurality of pieces of computer equipment is disclosed. In one aspect, the device comprises a communication unit configured to receive at least one signal from at least one piece of equipment of the pieces of equipment. The signal comprises information enabling a state of the piece of equipment to be determined. The device further comprises a control unit configured to determine a state of the rack based at least in part on the signal. The device further comprises a display unit for displaying a representation of the state determined by the control unit.

29 Claims, 4 Drawing Sheets

(51) Int. Cl.
*G08B 5/36* (2006.01)
*G06F 11/32* (2006.01)

(56) References Cited

U.S. PATENT DOCUMENTS

| | | | | |
|---|---|---|---|---|
| 5,666,271 | A * | 9/1997 | Kim | H05K 7/1422 361/726 |
| 6,107,929 | A * | 8/2000 | Amari | H01R 13/641 307/10.2 |
| 6,115,885 | A * | 9/2000 | Strickler | E05D 7/10 16/265 |
| 6,160,699 | A * | 12/2000 | Gibson | H02B 1/21 361/643 |
| 6,188,973 | B1 * | 2/2001 | Martinez | G06Q 10/06 702/188 |
| 6,220,456 | B1 * | 4/2001 | Jensen | G06F 1/16 211/189 |
| 6,281,860 | B1 * | 8/2001 | Ahrens, Jr. | G06F 1/181 345/30 |
| 6,977,587 | B2 * | 12/2005 | Pradhan | G01S 5/0289 340/539.1 |
| 7,436,303 | B2 * | 10/2008 | Tourrilhes | G06Q 10/06 340/572.1 |
| 7,460,978 | B1 * | 12/2008 | Brey | G06F 3/002 380/270 |
| 7,525,422 | B2 * | 4/2009 | Bishop | H04L 41/0631 340/508 |
| 7,596,476 | B2 * | 9/2009 | Rasmussen | G06F 1/20 361/695 |
| 7,642,914 | B2 * | 1/2010 | Campbell | G01S 13/876 340/539.13 |
| 2003/0046339 | A1 * | 3/2003 | Ip | H04L 41/12 709/203 |
| 2004/0170016 | A1 * | 9/2004 | Pellegrino | G06F 11/324 362/231 |
| 2005/0039085 | A1 * | 2/2005 | Takeda | G06F 3/0605 714/57 |
| 2005/0146426 | A1 * | 7/2005 | Pereira | H04L 41/0631 340/506 |
| 2005/0182831 | A1 * | 8/2005 | Uchida | G06F 11/32 709/220 |
| 2005/0228618 | A1 * | 10/2005 | Patel | G06F 9/505 702/188 |
| 2006/0044117 | A1 * | 3/2006 | Farkas | H02J 13/0006 713/340 |
| 2006/0047466 | A1 * | 3/2006 | White | H05K 7/20745 702/130 |
| 2006/0143255 | A1 * | 6/2006 | Shinohe | G06F 9/5083 |
| 2007/0101173 | A1 * | 5/2007 | Fung | G06F 1/3209 713/300 |
| 2007/0187343 | A1 * | 8/2007 | Colucci et al. | 211/26 |
| 2007/0213000 | A1 * | 9/2007 | Day | H05K 7/20754 454/184 |
| 2007/0240006 | A1 * | 10/2007 | Fung | G06F 1/32 713/323 |
| 2007/0250723 | A1 * | 10/2007 | Shima et al. | 713/300 |
| 2008/0002364 | A1 * | 1/2008 | Campbell | H05K 7/2079 361/699 |
| 2008/0091574 | A1 * | 4/2008 | Hamaji | G06Q 10/087 705/28 |
| 2008/0209931 | A1 * | 9/2008 | Stevens | F28D 15/0275 361/699 |
| 2008/0272887 | A1 * | 11/2008 | Brey | H04L 41/00 340/10.1 |
| 2009/0132842 | A1 * | 5/2009 | Brey | G06F 1/3203 713/322 |
| 2009/0282140 | A1 * | 11/2009 | White | H04L 67/12 709/223 |
| 2010/0079302 | A1 * | 4/2010 | Eide | G06F 11/32 340/691.8 |
| 2010/0109860 | A1 * | 5/2010 | Williamson | G08B 29/16 340/508 |
| 2010/0141379 | A1 * | 6/2010 | Tucker | H04Q 1/136 340/3.1 |
| 2011/0066895 | A1 * | 3/2011 | Windell | G06F 11/325 714/43 |
| 2011/0084839 | A1 * | 4/2011 | Groth | G06Q 10/087 340/572.1 |
| 2011/0200052 | A1 * | 8/2011 | Mungo et al. | 370/401 |
| 2011/0298629 | A1 * | 12/2011 | Wilson | G05B 23/0283 340/679 |
| 2011/0307820 | A1 * | 12/2011 | Rasmussen | G06F 1/206 715/771 |
| 2012/0204051 | A1 * | 8/2012 | Murakami | G06F 9/5088 713/324 |
| 2012/0253662 | A1 * | 10/2012 | Iguchi | G01C 21/3667 701/428 |
| 2013/0138650 | A1 * | 5/2013 | Fujii | H04L 41/0609 707/736 |

* cited by examiner

DEVICE FOR INDICATING A DATACENTER RACK AMONG A PLURALITY OF DATACENTER RACKS

RELATED APPLICATION

This application is a National Stage application of and claims benefit of priority to PCT Application No. PCT/FR2012/050836, filed on Apr. 17, 2012, which claims benefit of priority to French Application No. 1153571, filed on Apr. 26, 2011. The disclosure of each of the above-described applications are hereby expressly incorporated by reference in their entirety.

BACKGROUND

Field

The present application concerns the maintenance of systems, in particular, systems comprising datacenter cabinets adapted to receive items of equipment, more particularly a device to indicate a datacenter cabinet among a plurality of datacenter cabinets.

Description of the Related Technology

These datacenter cabinets are commonly known as racks. They are used in data processing centers commonly known as datacenters. Datacenters typically group together hundreds, and sometimes even thousands, of items or pieces of equipment. In case of failure, or of any other event requiring physical intervention on an item of equipment, it is necessary to identify and indicate the item of equipment among the high number of other items of equipment. This task is rendered difficult by the fact that certain items of equipment often have the same appearance and are only distinguished from each other by discreet characteristics such as identification numbers.

The solution consisting of going through the items of equipment one by one until the item of equipment on which to intervene is found is long and tedious. Labeling of the items of equipment with numbers that are easier to read may make the task faster but it is still tedious.

Contiguous numbering of the items of equipment can save time. This solution consists of numbering (for example in increasing order) the items of equipment disposed along a predetermined path (for example from top to bottom within a rack and from right to left in an aisle comprising several racks). Thus, by knowing the number of items of equipment stored in each rack, it is possible to deduce in which rack an item of equipment bearing a given number is indicated.

However, this solution is not flexible and implies revising the entire numbering if an item of equipment is replaced by several other items of equipment or if several items of equipment are replaced by a single item of equipment.

Another solution comprises using pre-existing data specific to each item of equipment to identify each item of equipment, for example a Media Access Control (MAC) type address, and associating each item of equipment with coordinates in a frame of reference defining a position in the datacenter (X representing for example a row number, Y representing for example a rack number and Z representing for example a position in the rack).

However, this solution is relatively complex to implement since it requires keeping a coherent database up to date concerning pre-existing data specific to the equipment and the coordinate data. Thus, according to the aforementioned example, it is necessary to know all the MAC addresses of all the items of equipment and to associate each with coordinates. In case of addition or removal of equipment, it is necessary to revise the entire coordinate system, as in the solution referred to earlier. Furthermore, such a solution requires the consolidation of the database to identify the location of an item of equipment.

There is thus a need to more simply and quickly locate an item of equipment in a datacenter in which items of equipment are disposed in racks.

SUMMARY OF CERTAIN INVENTIVE ASPECTS

According to a first embodiment, a device is provided for indicating a rack among a plurality of racks, the rack being configured to receive a plurality of items of computer equipment. The device comprises:

a communication unit configured to receive at least one signal from at least one piece of equipment of the pieces of equipment, the at least one signal comprising information enabling a state of the piece of equipment to be determined, a control unit configured to determine a state of the rack based at least in part on the signal, and a display unit configured to display a representation of the state determined by the control unit.

For example, the signal represents a state of at least one piece of equipment among a plurality of possible states.

In another example, the signal represents at least one value of at least one physical parameter particular to the piece of equipment.

In this example, the control unit is configured to determine a state of the piece of equipment according to the value of the physical parameter.

According to embodiments, the control unit is further configured to control the display unit to display at least one identifier of a piece of computer equipment with a representation of a state of the piece of computer equipment.

For example, the display unit comprises a light source configured to emit a light signal having one characteristic depending on the state of the rack determined by the control unit.

The piece of equipment may have a state from among a plurality of possible states, the possible states being ordered by levels.

For example, the control unit is configured to control the display unit to display a representation of the highest level state among the states of the pieces of equipment.

In another example, the display unit comprises a plurality of indicators respectively corresponding to the levels of the possible states, and wherein the control unit is configured to control the display unit such that each indicator is active if at least one piece of equipment is in the state corresponding to the indicator, and inactive otherwise.

It may be provided that at least one of the indicators may display at least one identifier of a piece of equipment, and that the control unit is configured to control the display unit such that for the indicator displays at least one identifier of a piece of equipment of which the state corresponds to the indicator.

For example, at least one of the indicators may display a number of pieces of equipment having the same state, and the control unit is configured to control the display unit such that the indicator displays a number of pieces of equipment of which the state corresponds to the at least one of the indicators.

In some embodiments, the control unit is configured to receive a command to modify the state of a piece of equipment.

According to a second embodiment, there is provided a rack configured to receive a plurality of pieces of computer equipment and comprising a device, the device comprising:

a communication unit configured to receive at least one signal from at least one piece of equipment of the pieces of equipment, the signal comprising information enabling a state of the piece of equipment to be determined, a control unit configured to determine a state of the rack based at least in part on the signal, and a display unit configured to display a representation of the state determined by the control unit.

For example, the rack comprises at least one piece of equipment comprising the control unit of the device.

In another example, the rack comprises a plurality of pieces of equipment and the control unit of the device is distributed in at least some of the plurality of pieces of equipment.

According to embodiments, the display unit is disposed on an external face of the rack.

An internal display unit disposed inside the rack may moreover be provided.

BRIEF DESCRIPTION OF THE DRAWINGS

Other features and advantages will become apparent upon reading the following non-limiting description, made with reference to the following Figures.

DETAILED DESCRIPTION OF CERTAIN ILLUSTRATIVE EMBODIMENTS

The embodiments disclosed herein provide an effective indicating means that is simple to implement, in particular for racks already in existence, to indicate a rack among a plurality of racks on which an operator may intervene.

A general context for implementation of one or more embodiments is presented first.

Figure 1:
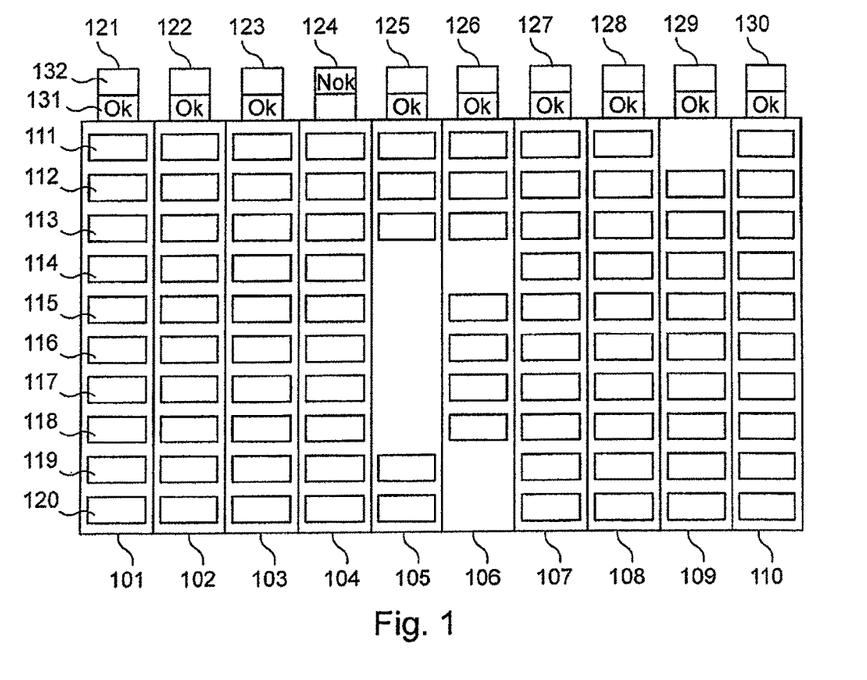
FIG. 1 is a diagram illustrating a row of racks, in accordance with one embodiment.

FIG. 1 is a diagram illustrating a row of racks, in accordance with one embodiment.

This row comprises ten racks 101 to 110. However, the row could of course comprise another number of racks. Each rack is adapted to receive a plurality of items of computer equipment (not shown), for example computers, data servers or other equipment. To that end, each rack may comprise housings 111 to 120, each adapted to receive an item of computer equipment. The racks each comprise a number of housings which may be different from one rack to another. By way of illustration, the racks 101, 102, 103, 104, 107, 108 and 110 comprise ten housings, the rack 105 comprises five, the rack 106 comprises seven and the rack 109 comprises nine.

In this example, the row thus comprises nearly a hundred items of equipment. According to one embodiment, a means is provided to the technician tasked with intervening on an item of equipment of the datacenter, for identifying a rack comprising an item of equipment on which he must intervene, without going through the nearly one hundred items of equipment.

For these purposes, a device for indicating a rack (hereinafter "the device") is associated with each rack to enable the indication thereof.

The devices represented in FIG. 1 comprise respective display units 121 to 130.

Each display unit comprises for example two light panels 131 and 132. The light panel 131 is for example green in color and/or may display the message "Ok" meaning that all the items of equipment indicated in the rack are in a normal state. The light panel 132 is for example red in color and/or may display the message "Nok" meaning that at least one item of equipment in the rack is not in a normal state. The panels 131 and 132 are activated on the basis of the state of the rack according to each item of equipment.

The light panels are for example positioned on the top of the racks for good visibility.

In the example represented in FIG. 1, all the racks may display the message "Ok" except for the rack 104 of which the display unit may display the message "Nok". The technician entering the aisle may thus directly identify the rack 104 that comprises a particular item of equipment, typically a defective item of equipment.

According to one embodiment, the display unit makes it possible to identify a rack comprising an item of equipment, in particular a defective item of equipment.

The display units thus enable a technician to rapidly intervene on a defective item of equipment.

Below, two embodiments are presented. The successive presentation of these embodiments does not exclude the combination of one or more features presented for a given embodiment with one or more features presented for another embodiment.

The first embodiment is directed to a distinct indicating device of the rack which may be placed on or fastened onto the rack and connected to components thereof. The second embodiment is directed to a device integrated into a rack.

Figure 2A:
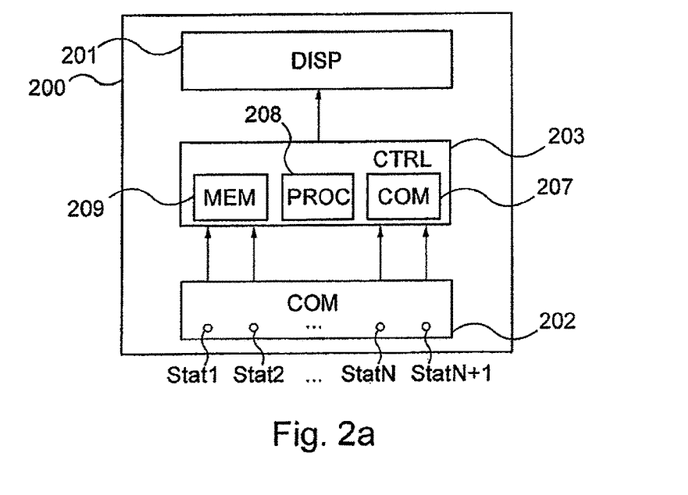
FIG. 2a is a diagram illustrating a device for indicating a rack, in accordance with one embodiment.

FIG. 2a is a diagram illustrating a device for indicating a rack, in accordance with one embodiment.

The structure of such a device is first described before presenting modalities for determining the state of the rack.

The device 200 is provided to be connected to an existing rack, for which it is mounted as an add-on, in order to indicate an anomaly relative to one or more items of equipment housed in the rack. This device is distinct from the rack in this example.

The device is typically placed on the top of a rack.

The device 200 comprises a display unit 201 to display a state of the items of equipment of the rack. Several variant embodiments are described below for this display unit.

The device further comprises a communication unit 202 for exchanging data with items of equipment present within the rack. For example, the communication unit comprises one or more Universal Serial Bus (USB) ports to connect the device to the items of equipment. The connection may be made directly between the communication unit and each item of equipment. Alternatively or in combination, the connection may be made indirectly via a connection interface (not shown), for example a "hub", or via an intermediate item of equipment. In this last case, the communication unit is connected to a first item of equipment which is itself connected to a second item of equipment, the first item of equipment taking on the task of sending the data relative to the state of the second item of equipment by means of its direct connection with the communication unit, and so forth.

In order to determine the general state of a rack, the indicating device furthermore has available a control unit 203 configured to determine the state of the rack on the basis of data received via the communication unit. The control unit is furthermore configured to control the display unit in order for it to display the state of the rack.

The determination of the state of a rack may be carried out according to several variants which must not be considered as exclusive of each other. Several of the variants described below may be implemented in the same embodiment.

According to a first variant, the device 200 receives, via its communication unit, state signals of the items of equipment present within the rack. In other words, the device directly receives a representation of the state of the items of equipment. For example, the items of equipment may be in "normal", "warning", "critical", "under maintenance" or other states and the items of equipment emit signals representing those states defined according to internal parameters of the item of equipment, for example such as the temperature of the processors, the frequency of clocks, or other parameters.

The determination of a state signal is carried out in the items of equipment according to standard algorithms for monitoring or diagnostics specific to each item of equipment.

The communication unit receives the signals and sends them to the control unit. The control unit then processes the received signals to determine an overall state of the rack.

Thus, for example, in the same rack, if all the items of equipment are in a "normal" state, the control unit may determine that the rack is in that state and control the display unit to display information reflecting that state, as described below. If on the other hand at least one of the items of equipment is in a state different from the "normal" state, the control unit may determine another state for the rack.

For example, the control unit hierarchizes the states of the items of equipment according to a level associated with each item of equipment. Typically, the "normal" state has the lowest level, the "critical" state has the highest level and the "warning" level has an intermediate level. The state "under maintenance" may have a still higher level than the "critical" state or an intermediate level between that of the "warning" and "critical" levels according to choices of implementation. Other choices are possible.

The control unit then determines the state of the rack as being the state of highest level among the states of the items of equipment. For example, if an item of equipment is in the "warning" state, another item of equipment is in the "critical" state and the other items of equipment are in the "normal" state, the control unit determines the state of the rack as being "critical" since that is the highest level state among the states of the items of equipment of the rack. The processing unit next controls the display unit to display an item of information representing the determined state, which in this case would be the "critical" state.

The rack only displays the "normal" state again when all the items of equipment are in the "normal" state.

To implement the determination of the state of the rack relative to the state signals from the items of equipment, the control unit may for example perform a logical combination of the states of the items of equipment monitored in the rack.

The determination of the state of the rack may be carried out continuously, that is to say that the communication unit continuously receives the signals from the items of equipment.

Thus, on reception of the state signals from the items of equipment, the control unit may maintain a ranking of the states according to their level and select the highest state.

Alternatively, the reception of the signals representing the states of the items of equipment may be carried out at particular times, for example at predetermined times corresponding to identified events.

Alternatively or in combination, the communication unit may be configured to emit signals to the items of equipment. Thus, the control unit may interrogate the items of equipment in order for the items of equipment to deliver a signal representing their respective states. For example, the control unit sends a request for that purpose to the items of equipment, via the communication unit. Alternatively, the request may be sent to an electronic card of the rack (not shown) which takes on the task of retrieving the information concerning the states of the items of equipment and of sending the information back to the communication unit of the device.

Figure 2B:
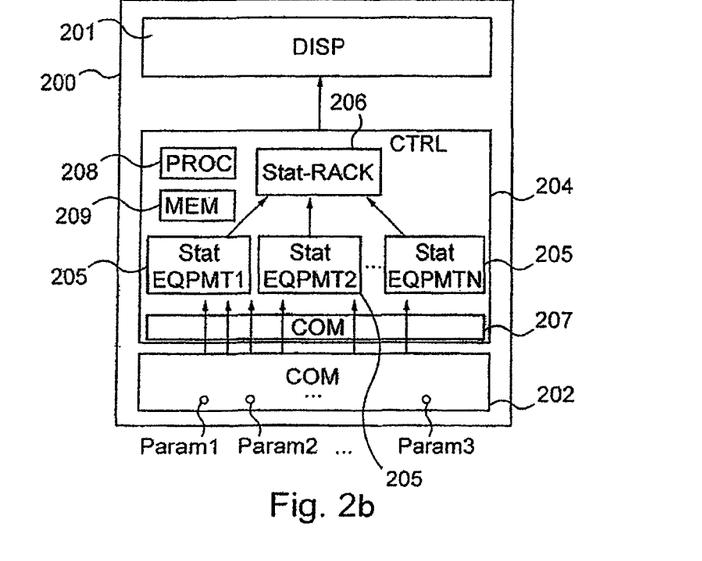
FIG. 2b is a diagram illustrating a device for indicating a rack, in accordance with another embodiment.

According to a second variant described with reference to FIG. 2b, the items of equipment do not send signals representing a state, but, in response to requests, send values of parameters enabling the control unit to establish a state of an item of equipment. These parameters are for example the temperature of processors, the frequency of clocks or other parameters.

Thus, in contrast to the variant referred to previously, the items of equipment do not themselves determine the state in which they are to be found, that task being performed by the control unit.

By way of illustration, the control unit asks an item of equipment to supply the control unit with the temperature and operating frequencies of the processor or processors. On reception of the values, the control unit compares the values with thresholds by means of one or more comparators 205. A single comparator may be provided which is given the task of comparing each received value with a threshold or several comparators each dedicated to a given parameter or dedicated to a given item of equipment. The state of the item of equipment is then determined in response to the comparisons made according to predetermined rules.

For example, the control unit analyses the change in those parameters to detect an excessive increase or decrease. Other modalities may be provided to determine the states of the items of equipment.

As in the first variant, the signals representing the states of the items of equipment or the values of parameters may be received continuously or at particular times.

Once the control unit has determined the state of each item of equipment, it determines the state of the rack in a module for determining the state of the rack 206 according to the modalities already explained for the first variant.

In a third variant, the control unit manages the two types of signals, that is to say those directly representing a state of an item of equipment ("normal", "critical", "warning", or other states), and signals characterizing parameters (temperature of the processors, clock frequency or other parameters) received on request.

Thus, for the same rack, the state of certain items of equipment may be determined according to the first variant whereas the state of other items of equipment may be determined according to the second variant.

According to this third variant, the indicating device is thus compatible both with the items of equipment that are themselves capable of determining their state and with the items of equipment that are not capable of determining their state.

In the variants presented above, the control unit may furthermore comprise a memory unit 209 with a sufficient quantity of memory to implement the control of the display unit and to receive state signals or signals representing state parameters from items of equipment. The memory unit comprises a so-called volatile memory (for example of random access memory (RAM) type), for processing computing data, and a so-called non-volatile memory (for example of read only memory (ROM) type) for more long-term data storage, for example such as the storage of a computer program for managing the control unit.

To implement this computer program, the control unit for example has a processor 208 configured to control the display unit and to manage the communications with the items of computer equipment.

The control unit may also have its own communication interface 207 to communicate with the display unit 201 and/or the communication unit 202 of the indicating device.

Below, a description is given of display unit embodiments which may be implemented in the variants referred to above.

For example, the display unit may indicate a normal operation (when the control unit has determined that the rack is in the "normal" state) by emitting a green light signal. In this same example, when a minor problem in an item of equipment is detected (when the control unit has determined that the rack is in the "warning" state), it may be signaled on the rack by an orange light signal. Lastly, when the detected problem is a critical or major problem (when the control unit has determined that the rack is in the "critical" state), it may be signaled by a red light signal.

The green, orange or red light signals may come from a liquid crystal display (LCD) screen, from one or more light emitting diodes (LEDs) from a specific indicator of the "traffic light" type, from a light source, or something else.

In order to display the state of the rack, the control unit may for example send an activation signal to the colored indicator (red, green or orange) corresponding to the selected state. In other embodiments, the control unit sends a control signal to display an indication on a screen.

Figure 3:
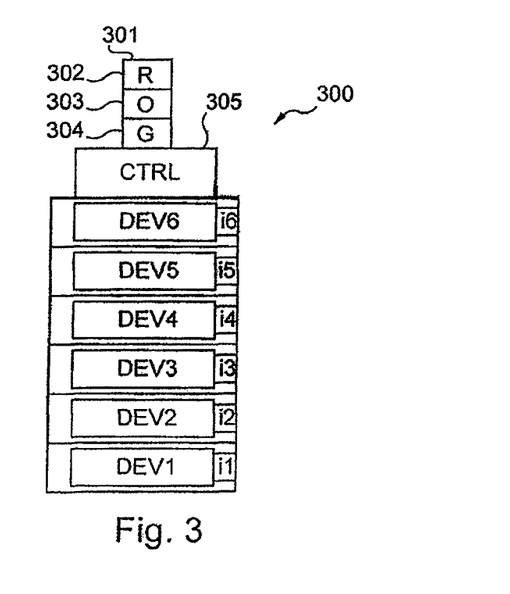
FIG. 3 is a diagram illustrating a rack in which a device is disposed, in accordance with one embodiment.

FIG. 3 illustrates a rack 300 on which a device in accordance with some embodiments is disposed comprising a display unit 301 and a control unit 305. The display unit 301 comprises three indicators 302, 303 and 304. The indicators 302, 303 and 304 may respectively emit a red, orange and green signal.

The use of a color code may enable the technician to organize his intervention on several items of equipment by setting an order of priority according to the light signal emitted by the display unit of each rack. It is noted here that several neighboring racks may use different indicating devices.

Alternatively or in combination, it may be provided to interpret a state according to the position of an indicator. Thus, for example, it is possible for the indicators 302, 303 and 304 not to be of different colors but a technician may interpret the activation of the highest indicator as a "critical" state, the activation of the lowest indicator as the "normal" state and the indicator in the middle as the "warning" state.

The display unit is for example disposed on an outside face of the rack. Thus, the display unit is visible from the outside. Moreover, the display unit is for example situated at a higher level, that is to say an upper face of the rack, in order to enable it to be seen from far off, for example at the end of an aisle (or row). This facilitates location for a technician.

Figure 4:
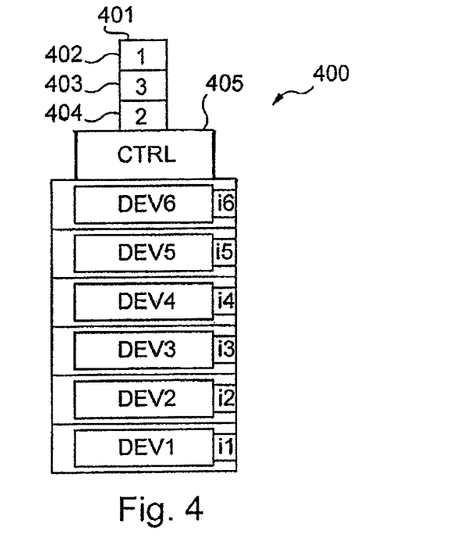
FIG. 4 is another diagram illustrating a rack in which a device is disposed, in accordance with another embodiment.
Figure 5:
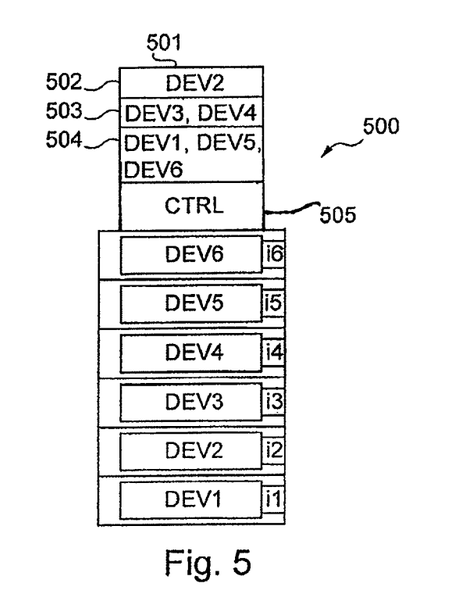
FIG. 5 is another diagram illustrating a rack in which a device is disposed, in accordance with another embodiment.

In embodiments of the display unit presented with reference to FIGS. 4 and 5, it is provided to display the number of items of equipment which are to be found in a given state (FIG. 4) or to display identifiers of the items of equipment in a given state (FIG. 5). It may also be provided to display the two items of information at the same time (number of items of equipment and identification thereof). In these embodiments, an LCD screen may be used.

On the rack 400 represented in FIG. 4, a device is disposed comprising a display unit 401 and a control unit 405. The display unit 401 has three indicators 402, 403 and 404 which are respectively red, orange and green like those of FIG. 3.

In the example of FIG. 4, there are two items of equipment in the "normal" state (green), three items of equipment in the "warning" state (orange) and one item of equipment in the "critical" state (red). Thus, the red indicator 402 displays the Figure "1", the orange indicator 403 displays the Figure "3" and the green indicator 404 displays the Figure "2".

Alternatively, or complementarily, a device comprising a display unit 501, with three indicators 502, 503 and 504 which are red, orange and green which are able to display an identifier of the items of equipment according to their state may be used in relation to a rack 500 as illustrated in FIG. 5. In the example of FIG. 5, the item of equipment DEV2 is in the "critical" state (red), the items of equipment DEV3 and DEV4 are in the "warning" state (orange), and the items of equipment DEV1, DEV5 and DEV6 are in the "normal" state. Thus, the red indicator 502 displays the string "DEV2", the orange indicator 503 displays the string "DEV3, DEV4", and the green indicator 504 displays the string "DEV1, DEV5, DEV6". The display unit is controlled by a control unit 505.

When the indicating device comprises a display unit as described with reference to FIGS. 4 and 5, the control unit may be configured to control the display of the number of items of equipment or the identifiers of the items of equipment.

It may furthermore be provided for the different states referred to above ("critical", "normal", "warning") to be modifiable by a technician from an item of equipment of the rack, or by another device via a dedicated interface (not shown).

For example, a technician may change an item of equipment from its initial state to an "under maintenance" state. Thus, if the technician needs to go away from the rack, he may return directly to that rack without having to search for it once again. The "under maintenance" state may be indicated by a specific indicator (of another color for example) or by activating all the indicators, for example.

The communication ports used may, for example, be USB ports. This type of port may be adapted to the nodes of datacenters of high performance computing (HPC) type. It is possible to provide other types of communication ports, or combinations of those communication ports to enable the implementation of one or more embodiments with a large range of items of computer equipment. For example, the communication ports of Serial or Ethernet type may be adapted to items of computer equipment such as network switches or power distribution units (PDUs).

In order to put back an item of equipment from a state different from "normal" to the "normal" state, a technician may manually define the state of an item of equipment directly on that item of equipment, or via a dedicated interface (not shown).

It may also be possible to define the state of an item of equipment automatically using a local or remote function, in particular a diagnostic function.

After having presented an embodiment wherein the indicating device is distinct from the racks, an embodiment is presented below wherein the indicating device is at least partially integrated into a rack.

Below, two variants are presented, which are not mutually exclusive of each other.

Figure 6:
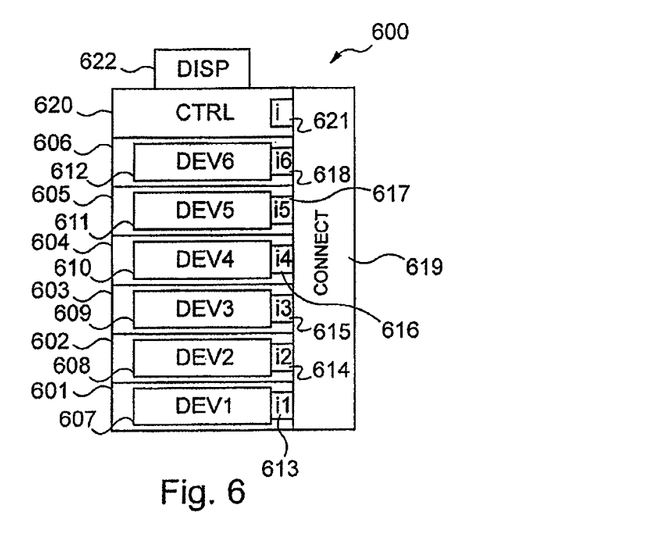
FIG. 6 is a diagram illustrating a rack, in accordance with an embodiment.

FIG. 6 represents a rack 600 according to the present embodiment with six housings 601 to 606 respectively receiving six items of computer equipment 607 to 612.

For example, the housings 601 to 606 each comprise respective communication ports 613 to 618. Alternatively or in combination, these communication ports belong to the items of computer equipment. These communication ports for example make it possible to connect the items of computer equipment 607 to 612 to each other or to connect them to other items of equipment of other racks. These communication ports may also serve to connect each item of equipment directly or indirectly to a control unit 620 via a communication port 621 of the control unit.

The various connections between the items of equipment and the control unit are represented generically by the connection means 619. The connection means may for example comprise a set of connector cables or a pre-cabled communication interface.

The control unit controls a display unit 622. This display unit may be of the same type as those referred to for the first embodiment.

Furthermore, the control unit may operate in the same manner as that referred to in the first embodiment.

In order to facilitate the maintenance, a second display unit may also be provided inside the rack to duplicate a current display of the indicating device associated with the rack.

Figure 7:
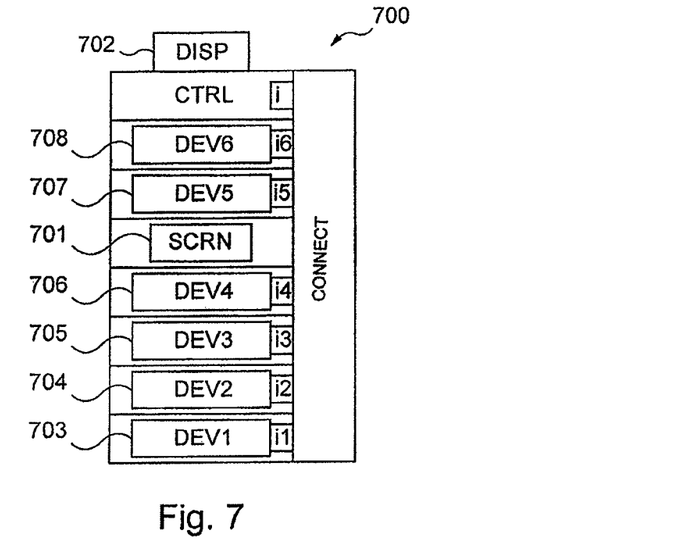
FIG. 7 is another diagram illustrating a rack, in accordance with another embodiment.

FIG. 7 illustrates a rack 700 having such an internal display unit 701. The rack comprises an external display unit 702, and housings 703, 704, 705, 706, 707 and 708 to receive items of computer equipment.

The internal display unit 701 is for example disposed at the height of a person in order to give an easy view to a technician as to the state in course of display on the external display unit 702. Indeed, with the external display unit 702 positioned high up in order to be visible from far away, it may be uncomfortable for a technician to be able to view the current display even when he is very close to the rack for intervention thereupon.

The internal display unit may be used to display other information useful to a technician for his intervention. For example, such information may guide him in identifying a defective item of equipment (for example the identifier or position of the defective item of equipment) or in establishing a diagnostic. For example, the internal display unit may display technical data or indications as to the origin of the fault. The presented information may for example correspond to the parameters which led to the state of the rack (temperature, clock frequency or other parameters) being established. By way of illustration, if the item of equipment has been judged to be in a state different from "normal" on account of an excessive rise in temperature, the internal display unit may display the temperature of the item of equipment.

According to a first variant, the control unit is integrated into the rack. It may then constitute a module belonging to the rack.

As in the first embodiment, the control unit manages signals from items of equipment representing an equipment state and/or signals representing parameters of the item of equipment and enabling the control unit to determine its state to deduce therefrom, with the states of the other items of equipment, the state of the rack.

According to a second variant, the control unit is an item of equipment inserted into a housing of the rack. Thus, the control unit is considered to be an item of equipment integrated into the rack in the same manner as the items of equipment monitored by the control unit.

In this second variant, the control unit may also be distributed in terms of hardware or software among several items of equipment. For example, continuing with the references of FIG. 2b, each item of equipment can comprise a comparator 205 to determine the state of the item of equipment within the item of equipment itself. The module for determining the state of the rack 206 may be disposed in a dedicated item of equipment or form part of the rack as an integrated module.

On reading the present detailed description, other variant embodiments will be apparent to the person skilled in the art. The person skilled in the art will moreover be capable of configuring a control unit or of producing a computer program for managing such a control unit to produce a device or a rack according to one or more embodiments disclosed herein.

The invention claimed is:

1. A device for indicating a state of a rack among a plurality of racks, the rack being configured to receive a plurality of pieces of computer equipment, the device comprising:

a communication unit adapted to receive a first signal from a first piece of computer equipment of the plurality of pieces of computer equipment and a second signal from a second piece of computer equipment of the plurality of pieces of computer equipment, each of the first and second signals comprising information enabling a state of each of the first and second pieces of computer equipment to be determined, wherein each of the plurality of pieces of computer equipment has a state from among a plurality of possible states, the possible states being ordered by levels;

a control unit adapted to hierarchize the determined states of the first and second pieces of computer equipment according to a level associated with each of the first and second pieces of computer equipment and based on the determined state associated with each of the first and the second signals to determine the state of the rack based on the hierarchized states, wherein the hierarchizing of the determined states comprises comparing a first level of the determined state of the first piece of computer equipment with a second level different than the first level of the determined state of the second piece of computer equipment; and a display unit adapted to display a representation of the state of the rack determined by the control unit based on the comparison, wherein the display unit comprises a plurality of indicators respectively corresponding to the levels of the plurality of possible states, wherein the control unit is adapted to control the display unit such that each indicator of the plurality of indicators is active if at least one of the plurality of pieces of computer equipment is in the state corresponding to the indicator, and inactive otherwise, wherein at least one of the plurality of indicators is configured to display an identifier of at least one piece of computer equipment of the rack, responsive to the at least one piece of computer equipment being in the state corresponding to the at least one indicator, wherein the control unit is adapted to control the display unit such that the at least one indicator is configured to display the identifier, and wherein a first indicator of the plurality of the indicators is adapted to indicate a first level of alarm of the rack and a second indicator of the plurality of the indicators is adapted to indicate a second level of alarm of the rack that is different from the first level of alarm, wherein the first indicator is adapted to display the identifier of each piece of computer equipment that is in the state corresponding to the first indicator and wherein the second indicator is configured to display the identifier of each piece of computer equipment that is in the state corresponding to the second indicator, and wherein the control unit is adapted to control the display unit such that the first and the second indicators are adapted to display the respective identifiers.

2. The device according to claim 1, wherein the first signal represents a value of a physical parameter particular of the first piece of computer equipment, and wherein the control unit is adapted to determine a state of the first piece of computer equipment according to the value of the physical parameter.

3. The device according to claim 1, wherein the display unit comprises a light source configured to emit a light signal having one characteristic depending on the state of the rack determined by the control unit.

4. The device according to claim 1, wherein the control unit is adapted to receive a command to modify the state of a piece of computer equipment.

5. The device according to claim 1, wherein the state of the rack determined by the control unit corresponds to a state among the hierarchized states that has a highest level.

6. The device according to claim 5, wherein the state that has the highest level is a critical state.

7. The device according to claim 5, wherein the hierarchized states include a critical state associated with the highest level, a normal state associated with a lowest level and a warning state associated with an intermediary level, which is between the highest level and the lowest level.

8. The device according to claim 1, wherein the control unit is adapted to interrogate the first and second pieces of computer equipment such that the first and second pieces of computer equipment transmit the first and second signals, respectively, to the communication unit, each of the first and second signals including a signal representing the state of the respective piece of computer equipment.

9. The device according to claim 1, wherein the device for indicating the rack is distinct from the rack, the device being mounted or fastened onto the rack as an add-on for connecting to components thereof.

10. The device according to claim 1, wherein the device for indicating the rack is integrated into the rack.

11. The device according to claim 1, wherein the first and second signals are respectively received, from the first and second pieces of computer equipment at the communication unit, via one or more universal serial bus (USB) ports.

12. The device according to claim 1, wherein the control unit is adapted to interrogate the first and second pieces of computer equipment such that the first and second pieces of computer equipment transmit the first and second signals, respectively, to the communication unit, each of the first and second signals including one or more parameters that enable the control unit to establish the state of the respective piece of computer equipment.

13. The device according to claim 12, wherein the control unit establishes the state of the respective piece of computer equipment by comparing the one or more parameters with one or more thresholds.

14. The device according to claim 12, wherein the control unit establishes the state of the respective piece of computer equipment by analyzing the one or more parameters and detecting an excessive increase or decrease in the one or more parameters.

15. The device according to claim 1, further comprising a second display unit configured to duplicate a current display of the display unit, wherein the second display unit is provided inside the rack.

16. The device according to claim 15, wherein the second display unit displays technical data or indicates an origin of a fault.

17. The device according to claim 1, wherein each of the first and second pieces of computer equipment is configured to determine its own state from among the plurality of possible states.

18. The device according to claim 1, wherein the displayed state of the rack is modifiable by a user of the rack via one of the plurality of pieces of equipment or via another piece of equipment including a dedicated interface.

19. A rack configured to receive a plurality of pieces of computer equipment, comprising a device for indicating a state of the rack among a plurality of racks, the device comprising:

a communication unit adapted to receive a first signal from a first piece of computer equipment of the plurality of pieces of computer equipment and a second signal from a second piece of computer equipment of the plurality of pieces of computer equipment, each of the first and second signals comprising information enabling a state of each of the first and second pieces of computer equipment to be determined, wherein each of the plurality of pieces of computer equipment has a state from among a plurality of possible states, the possible states being ordered by levels;

a control unit adapted to hierarchize the determined states of the first and second pieces of computer equipment according to a level associated with each of the first and second pieces of computer equipment and based on the determined state associated with each of the first and the second signal to determine the state of the rack based on the hierarchized states, wherein the hierarchizing of the determined states comprises comparing a first level of the determined state of the first piece of computer equipment with a second level different than the first level of the determined state of the second piece of computer equipment; and a display unit adapted to display a representation of the state of the rack determined by the control unit based on the comparison, wherein the display unit comprises a plurality of indicators respectively corresponding to the levels of the plurality of possible states, wherein the control unit is adapted to control the display unit such that each indicator of the plurality of indicators is active if at least one of the plurality of pieces of computer equipment is in the state corresponding to the indicator, and inactive otherwise, wherein at least one of the plurality of indicators is configured to display an identifier of at least one piece of computer equipment of the rack, responsive to the at least one piece of computer equipment being in the state corresponding to the at least one indicator, and wherein the control unit is adapted to control the display unit such that the at least one indicator is configured to display the identifier, and wherein a first indicator of the plurality of the indicators is adapted to indicate a first level of alarm of the rack and a second indicator of the plurality of the indicators is adapted to indicate a second level of alarm of the rack that is different from the first level of alarm, wherein the first indicator is adapted to display the identifier of each piece of computer equipment that is in the state corresponding to the first indicator and wherein the second indicator is configured to display the identifier of each piece of computer equipment that is in the state corresponding to the second indicator, and wherein the control unit is adapted to control the display unit such that the first and the second indicators are adapted to display the respective identifiers.

20. The rack according to claim 19, comprising at least one piece of computer equipment comprising the control unit of the device.

21. The rack according to claim 19, comprising the plurality of pieces of computer equipment, the control unit being distributed in at least some of the pieces of computer equipment.

22. The rack according to claim 19, wherein the display unit is disposed on an outside face of the rack.

23. The rack according to claim 22, further comprising an internal display unit disposed inside the rack, wherein the internal display unit is configured to display at least a same information displayed by the display unit.

24. The rack according to claim 19, further comprising an internal display unit disposed inside the rack.

25. The rack according to claim 19, wherein the state of the rack determined by the control unit corresponds to a state among the hierarchized states that has a highest level.

26. The rack according to claim 25, wherein the state that has the highest level is a critical state.

27. The rack according to claim 25, wherein the hierarchized states include a critical state associated with the highest level, a normal state associated with a lowest level and a warning state associated with an intermediary level, which is between the highest level and the lowest level.

28. The rack according to claim 19, wherein the control unit is adapted to interrogate the first and second pieces of computer equipment such that the first and second pieces of computer equipment transmit the first and second signals, respectively, to the communication unit, each of the first and second signals including a signal representing the state of the respective piece of computer equipment.

29. A device for indicating a state of a rack among a plurality of racks, the rack being configured to receive a plurality of pieces of computer equipment, the device comprising:

a communication unit adapted to receive a first signal from a first piece of computer equipment of the plurality of pieces of computer equipment and a second signal from a second piece of computer equipment of the plurality of pieces of computer equipment, each of the first and second signals comprising information enabling a state of each of the first and second pieces of computer equipment to be determined, wherein each of the plurality of pieces of computer equipment has a state from among a plurality of possible states, the possible states being ordered by levels;

a control unit adapted to hierarchize the determined states of the first and second pieces of computer equipment according to a level associated with each of the first and second pieces of computer equipment and based on the determined state associated with each of the first and the second signals to determine the state of the rack based on the hierarchized states, wherein the hierarchizing of the determined states comprises comparing a first level of the determined state of the first piece of computer equipment with a second level different than the first level of the determined state of the second piece of computer equipment; and a display unit adapted to display a representation of the state of the rack determined by the control unit based on the comparison, wherein the display unit comprises a plurality of indicators respectively corresponding to the levels of the plurality of possible states, wherein the control unit is adapted to control the display unit such that each indicator of the plurality of indicators is active if at least one of the plurality of pieces of computer equipment is in the state corresponding to the indicator, and inactive otherwise, wherein a first indicator of the plurality of indicators is adapted to indicate a first level of alarm of the rack and a second indicator of the plurality of the indicators is adapted to indicate a second level of alarm of the rack that is different from the first level of alarm, wherein the first indicator is adapted to display a first number of pieces of computer equipment of the rack that is in the state corresponding to the first indicator, and wherein the second indicator is adapted to display a second number of pieces of computer equipment of the rack that is in the state corresponding to the second indicator, and wherein the control unit is adapted to control the display unit such that the first and second indicators are adapted to display the first and second numbers.

* * * * *